(12) United States Patent
Jung

(10) Patent No.: US 8,136,706 B2
(45) Date of Patent: Mar. 20, 2012

(54) SCREW FEEDER

(76) Inventor: Dirk Jung, Weckersdorf (DE)

( * ) Notice: Subject to any disclaimer, the term of this patent is extended or adjusted under 35 U.S.C. 154(b) by 463 days.

(21) Appl. No.: 12/309,141

(22) PCT Filed: Jun. 22, 2007

(86) PCT No.: PCT/DE2007/001119
§ 371 (c)(1),
(2), (4) Date: Jan. 7, 2009

(87) PCT Pub. No.: WO2008/006335
PCT Pub. Date: Jan. 17, 2008

(65) Prior Publication Data
US 2009/0255955 A1 Oct. 15, 2009

(30) Foreign Application Priority Data
Jul. 13, 2006 (DE) .................. 10 2006 033 219

(51) Int. Cl.
*B67D 5/08* (2006.01)

(52) U.S. Cl. ............................. 222/413; 222/55; 222/63

(58) Field of Classification Search ................... 222/413, 222/412, 55, 63, 1
See application file for complete search history.

(56) References Cited

U.S. PATENT DOCUMENTS

| 5,524,796 A | 6/1996 | Hyer |
| 5,848,728 A * | 12/1998 | Ricciardi et al. .............. 222/63 |
| 6,073,818 A | 6/2000 | Rothenberg et al. |

FOREIGN PATENT DOCUMENTS

| DE | 10336456 | 3/2005 |
| JP | 10120144 | 5/1998 |

* cited by examiner

*Primary Examiner* — Kevin P Shaver
*Assistant Examiner* — Donnell Long
(74) *Attorney, Agent, or Firm* — Horst M. Kasper

(57) ABSTRACT

Screw feeder (1) for transporting and/or metering pulverulent or granular material, having a rotatably mounted feeder screw (3) for the transport of material from a storage vessel (2) to a discharge opening (6), and having a variable-speed motor (4) for driving the feeder screw, characterized in that the speed is controlled by a programmable regulating device (7) which regulates the speed of the motor as a function of the respectively determined rotary position of the feeder screw within one full worm revolution.

20 Claims, 2 Drawing Sheets

SCREW FEEDER

Figure 1:
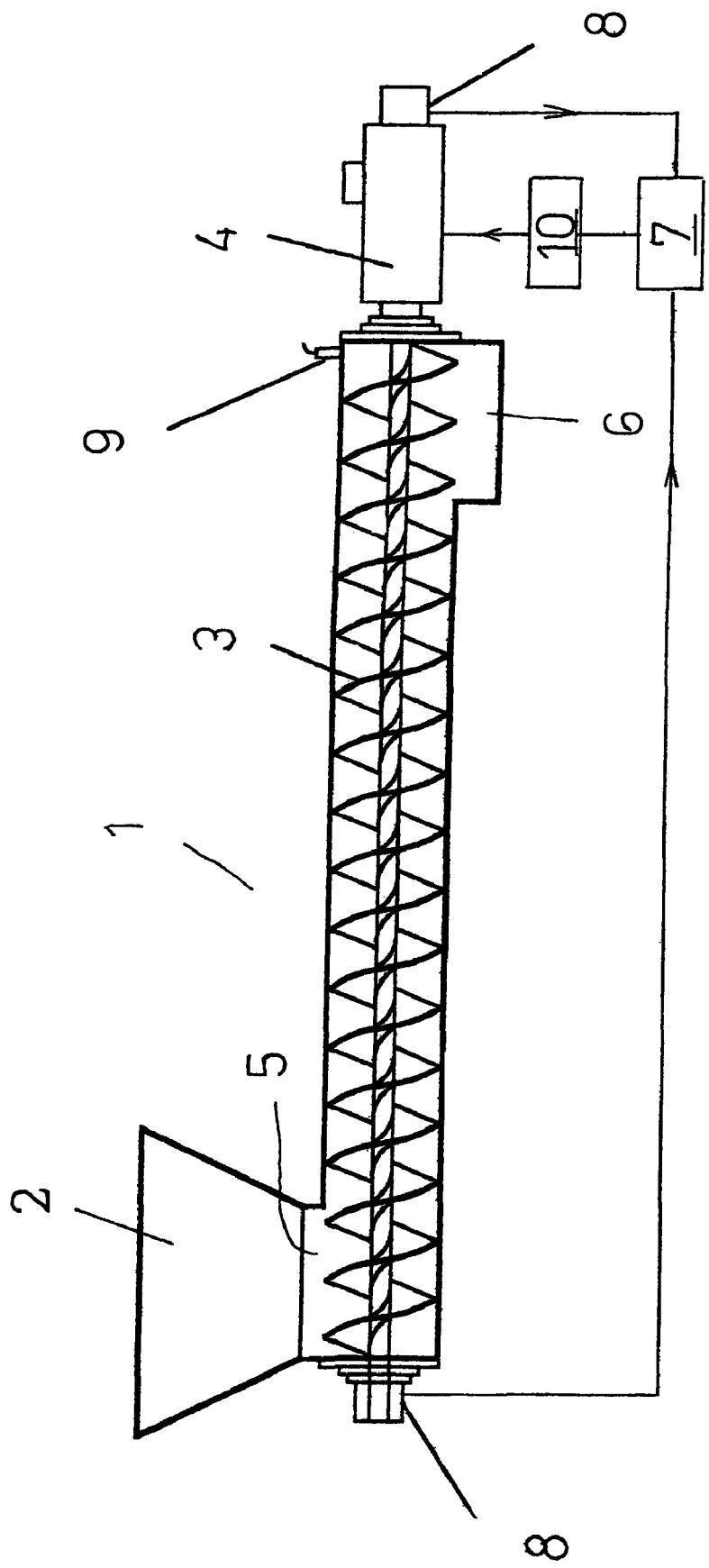

The invention relates to a screw feeder for transporting and/or metering pulverulent, granular or any material transportable in such a device.

In known transporting devices of this kind, the discharge of material is carried out in dependence on the degree of filling and on the rotational speed of the screw feeder as well as on the pitch of the screw in mostly more or less non-uniform portions of material. Principle dependent a periodically pulsating flow of material results at the discharge opening of the screw feeder. This pulsation in the material output is less of importance at sufficiently high numbers of rotation of the feeder, since, in the timely succession, the delivery of the individual portions of material is succeeding so closely to one another that a quasi-continuous flow of material results. On the other hand, low numbers of rotation of the feeder can result in strongly differing amounts of delivery with a periodicity in dependence on the revolution period of the feeder screw. The considerable differences between maximal and minimal output which are then prevailing, are a considerable problem in applications in which the constancy of the material flow plays a decisive role, for example, in numerous metering/dosing devices. Such a disadvantageous effect can even be deteriorated when the screw feeder is only partly filled with material to be transported, when the material tends to pack, or when the sliding back of the material into the extraction area—in particular, when the screws are not horizontally arranged-implies additional difficulties.

To overcome this problem, technical solutions have been proposed the aim of which is to obtain an uniformly distributed discharge of the conveyed material by means of mechanical accessory equipment at the discharge end of a feeder screw being arranged horizontally or partially inclined.

Accordingly DD 252 166 A1 discloses a screw feeder having a discharge device which comprises a locking element operating as a choke which is closed when the dosed amount is obtained. A timely non-interrupted constant flow of material cannot be obtained by that solution.

From DE 350 2765 C2 a vane screw is known which is arranged at the discharge end of the screw feeder and is connected rotatably with the shaft of the latter, the material to be transported being passed through said vane screw and crushed by the same, whereby at the end of the conveying path still adherent residual quantities of the pulverulent material will be carried along by the rotating vane screw.

An arrangement according to EP 0475 909 A1 with a screw conveyor for finely metering/dosing very small delivery amounts employs for obtaining uniform outputs an external tube which is arranged at the discharge end of the feeder screw and encloses the stationary feeder tube, said external tube is seated for rotation and open on one side. The rotational speed of the latter is proportional to the rotational speed of the feeder screw. Due to the rotational movement of the external tube the material to be conveyed which is passed from the stationary tube to the external tube, shall be distributed in such a way that it is discharged highly uniformly and without periodical fluctuations of the material amounts. However, the uniformity of the material discharge obtainable with the above mentioned accessory elements is by no means sufficient with many applications. In this case, also limitations with respect to the angles of inclination of the conveying path which have to be kept to can turn out as disadvantageous.

Furthermore, methods and devices for metering/dosing regulation which operate by the gravimetric method are known from practice and described, for example, in DE 29 03 259 C2, U.S. Pat. Nos. 5,423,456, and 5,184,754. In these, the deviation from the desired value for the weight of the discharged material, detected by weighing devices, will be minimized by a speed control of the discharging element. Generally, such solutions are neither suited to prevent periodical fluctuations in the material discharge.

Therefore, it is an object of the present invention to provide a screw feeder by which under use of suitable technical means, the periodically occurring fluctuations of the flow of material can be avoided—irrespective of the respective properties of the material, of the constructive setup of the employed feeder screw, and also of the rotational speed of the latter—as well as to omit probable limitations with respect to the inclination position of the conveying path.

According to the invention the object is realized by a screw feeder preferably adapted for transporting and/or metering pulverulent or granular material, said screw feeder comprising a feeder screw seated for rotation for transporting material from a storage vessel to a discharge opening, and a variable speed motor for driving the feeder screw, characterized in that that the speed is controlled by a speed controller which controls the rotational speed of the motor in dependence on the respective rotational position of the feeder screw within one full screw revolution.

Further features of the invention are object of a plurality of dependent claims.

The invention will be explained hereinafter in more detail by virtue of one embodiment and two schematical representations.

There is shown in

Figure 2:
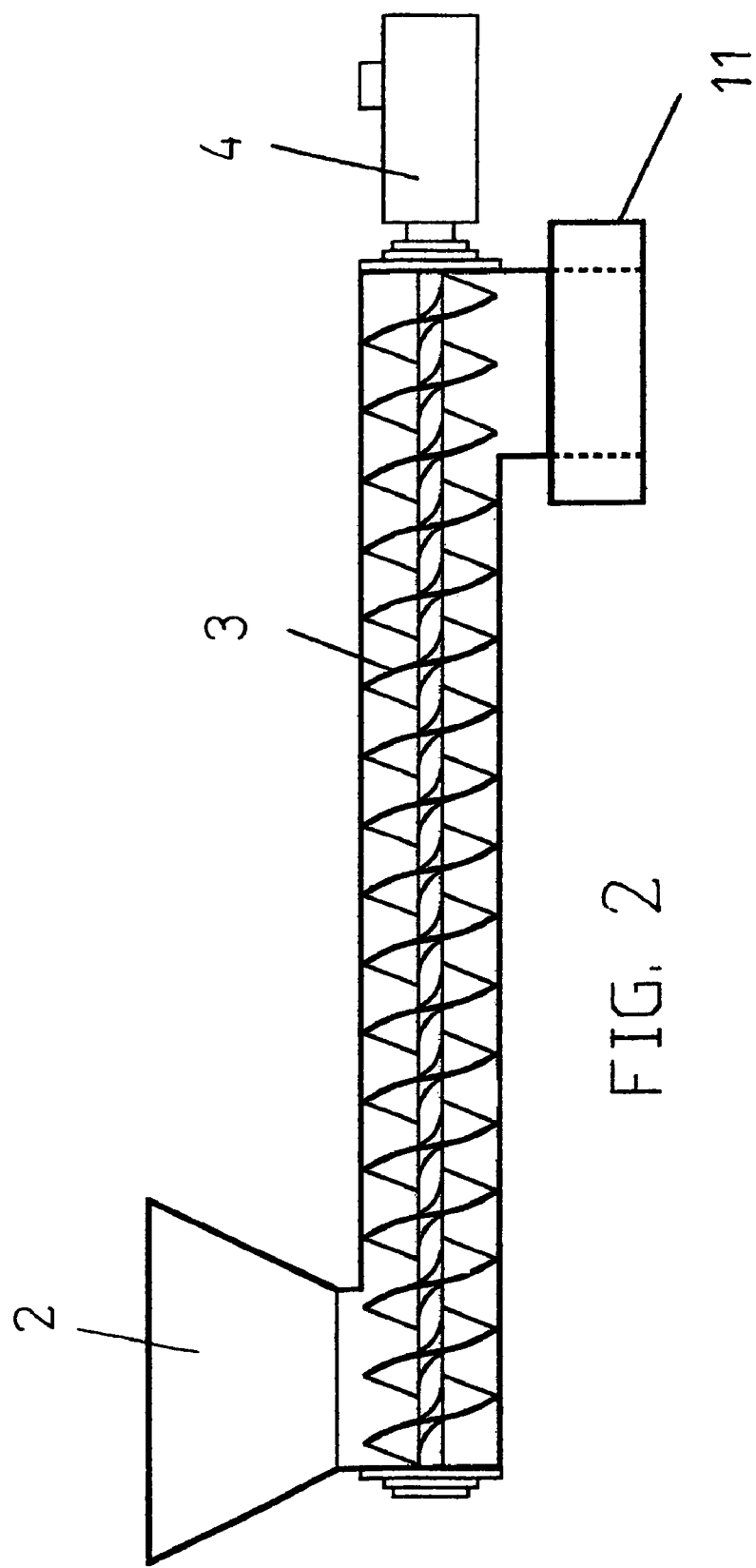

FIG. 1 a screw feeder in horizontal position comprising a feeder screw seated for rotation on both of its ends and comprising means for varying the rotational speed of the feeder screw within one of its full revolution, and FIG. 2 a screw feeder according to FIG. 1 comprising a sequential measuring unit, sensing unit and/or image processing unit for detecting characteristic data and characteristic lines, respectively.

The schematical representation of FIG. 1 shows a horizontally arranged screw feeder 1 with a hopper 2 for receiving the granular material as well as a feeder screw 3 which is rotational and seated on both of its ends. The material is transported by the feeder screw, driven by a motor 4 of variable rotational speed, from the input opening 5 to the output opening 6 and discharged there. Provided that the feeder screw 3 rotates with a uniform rotational speed, then as usual strongly varying amounts of the transported material are delivered in a timely sequence when small capacities are concerned, the periodicity of which is determined by the time duration of a full revolution of the feeder screw. In order to obviate this disadvantage and to ensure the most uniform material output possible, a central control unit 7 is provided for controlling the rotational speed of the feeder screw 3. A sensing device comprising incremental selsyns 8 supplies an electric signal for the respective rotational position and angular position, respectively, of the feeder screw which signal is fed into the control unit. The angular positions of the feeder screw, detected in this manner, to which at the same time a definite value of the conveyed capacity by the feeder screw at said feeder screw position will be associated, are compared by the control unit 7 to a reference value, based on a mean conveyed capacity. In this manner a control signal is produced which is substantially derived from the signal difference of the selsyns and the reference value. Said control signal is fed into a speed controller 10 which, in turn, varies the rotational speed of the electro-motor and, hence, the material throughput of the feeder screw, and thus matches the conveyed capacity of the latter to the mean material output. The connection between the respective angular position of the feeder screw and the associated value for the material output, which has, as a periodically varying value, a cycle duration equal to the revolution duration of the screw, has been detected before for discrete angular positions and over one full screw revolution at a uniform rotational speed of the feeder screw. Said connection is part of the control algorithm of the central control unit. A reference sensor 9 is adapted to detect the absolute position of the feeder screw.

The variation of the rotational speed of the feeder screw is carried out in such a manner that the feeder screw rotates more slowly in those positions of the feeder screw shaft in which much material is transported through the discharge opening, whereas, vice versa, the feeder screw rotates faster in those positions of the feeder screw shaft with low material throughput. Thus a more uniform flow of material can be obtained at the discharge end. Of course, the control operations for varying the rotational speed of the screw feeder can also be carried out by a respectively programmed computer unit, for example, in practice as an "electronic cam disk".

FIG. 2 shows a measuring, sensing, and image processing unit 11 added to the device according to FIG. 1 which unit is adapted to detect the characteristic values of the material output of the feeder screw 3 and to display said characteristic values. The derived functional values at a constant rotational speed of the feeder screw and the graphic image of the former shown as a characteristic curve are again the determining size for the control algorithm of the control unit for varying the rotational speed of the rotating feeder screw.

The invention claimed is:

1. A screw feeder preferably adapted for transporting and/or metering pulverulent or granular material comprising a feeder screw (3) seated for rotation for transporting material from a storage vessel (2) to a discharges opening (6), and a variable speed motor (4) for driving said feeder screw, said motor being characterized in that, that the rotational speed control is obtained by a programmable control unit (7) which controls the rotational speed of the motor in dependence on the respective detected rotational position of the feeder screw within one full screw revolution, wherein a reference sensor (9) is provided for detecting absolute rotational position of the feeder screw (3).

2. A screw feeder as claimed in claim 1, characterized in that an incremental selsyn (8) is provided at the feeder screw (3) or at the shaft of the latter to detect the rotational position.

3. A screw feeder as claimed in claim 1, characterized in that a reference sensor (9) is provided for detecting absolute rotational position of the feeder screw (3).

4. A screw feeder as claimed in claim 1, characterized in that an absolute measuring selsyn is provided at the feeder screw (3) or at the drive shaft of the latter for detecting the rotational position and/or the absolute rotational position.

5. A screw feeder as claimed in claim 1, characterized in that suitable measuring and displaying means (11) are provided to detect the characteristic values for the material throughput of the feeder screw (3) as well as for plotting a characteristic curve characterizing the material throughput.

6. A screw feeder as claimed in claim 1, characterized in that an incremental selsyn (8) is provided at the feeder screw (3) or at the shaft of the latter to detect the rotational position.

7. A screw feeder as claimed in claim 1, characterized in that an absolute measuring selsyn is provided at the feeder screw (3) or at the drive shaft of the latter for detecting the rotational position and/or the absolute rotational position.

8. A screw feeder preferably adapted for transporting and/or metering pulverulent or granular material comprising:

a feeder screw (3) seated for rotational movements about its longitudinal axis for transporting material from a storage vessel (2) to a discharge opening (6), whereby said storage vessel (2) positioned adjacent to one longitudinal end of said screw feeder as input opening and said discharge opening being positioned adjacent to the other longitudinal end of said screw feeder, a variable speed motor (4), which is engaged with said rotatably seated feeder screw (3) for driving said feeder screw, and a programmable control unit (7), which is coupling with means for detecting of rotational position of the feeder screw (3) and connected with said variable speed motor (4), said programmable control unit controls the rotational speed of said motor in dependence on the respective detected rotational position of the feeder screw (3) within one full screw revolution.

9. A screw feeder as claimed in claim 8, characterized in that the rotational speed control is additionally controlled in dependence on the amount of the discharged material, detected by a weighing means, and/or in dependence on the preselected angle of inclination of the feeder screw (3).

10. A screw feeder as claimed in claim 8, characterized in that an electromotive drive is provided for driving the screw shaft of the feeder screw (3).

11. A screw feeder as claimed in claim 8, characterized in that an incremental selsyn (8) is provided at the feeder screw (3) or at the shaft of the latter to detect the rotational position.

12. A screw feeder as claimed in claim 8, characterized in that a reference sensor (9) is provided for detecting absolute rotational position of the feeder screw (3).

13. A screw feeder as claimed in claim 8, characterized in that an absolute measuring selsyn is provided at the feeder screw (3) or at the drive shaft of the latter for detecting the rotational position and/or the absolute rotational position.

14. A screw feeder as claimed in claim 8, characterized in that suitable measuring and displaying means (11) are provided to detect the characteristic values for the material throughput of the feeder screw (3) as well as for plotting a characteristic curve characterizing the material throughput.

15. A screw feeder as claimed in claim 8, characterized in that the rotational speed control is additionally controlled in dependence on the amount of the discharged material, detected by a weighing means, and/or in dependence on the preselected angle of inclination of the feeder screw (3).

16. A screw feeder as claimed in claim 8, characterized in that an electromotive drive is provided for driving the screw shaft of the feeder screw (3).

17. A screw feeder as claimed in claim 8, characterized in that an incremental selsyns (8) is provided at the feeder screw (3) or at the shaft of the latter to detect the rotational position.

18. A screw feeder as claimed in claim 8, characterized in that a reference sensor (9) is provided for detecting absolute rotational position of the feeder screw (3).

19. A screw feeder as claimed in claim 8, characterized in that an absolute measuring selsyn is provided at the feeder screw (3) or at the drive shaft of the latter for detecting the rotational position and/or the absolute rotational position.

20. A screw feeder as claimed in claim 8, characterized in that suitable measuring and displaying means (11) are provided to detect the characteristic values for the material throughput of the feeder screw (3) as well as for plotting a characteristic curve characterizing the material throughput.

* * * * *